J. M. Fuchs' Impt. in Manufacturing Albumen.

72625

**PATENTED
DEC 24 1867**

Witnesses:
M Comby
A Lellere

Jean Michel Fuchs

United States Patent Office.

JEAN MICHEL FUCHS, OF NEW YORK, N. Y.

Letters Patent No. 72,625, dated December 24, 1867.

---

IMPROVED PROCESS FOR MANUFACTURING ALBUMEN.

---

*The Schedule referred to in these Letters Patent and making part of the same.*

---

TO ALL WHOM IT MAY CONCERN:

Be it known that I, JEAN MICHEL FUCHS, of the city, county, and State of New York, have invented a new and useful Process of Manufacturing Albumen, of which the following is a full, clear, and exact description, reference being had to the accompanying drawing forming part of this specification, and in which—

Figure 1:
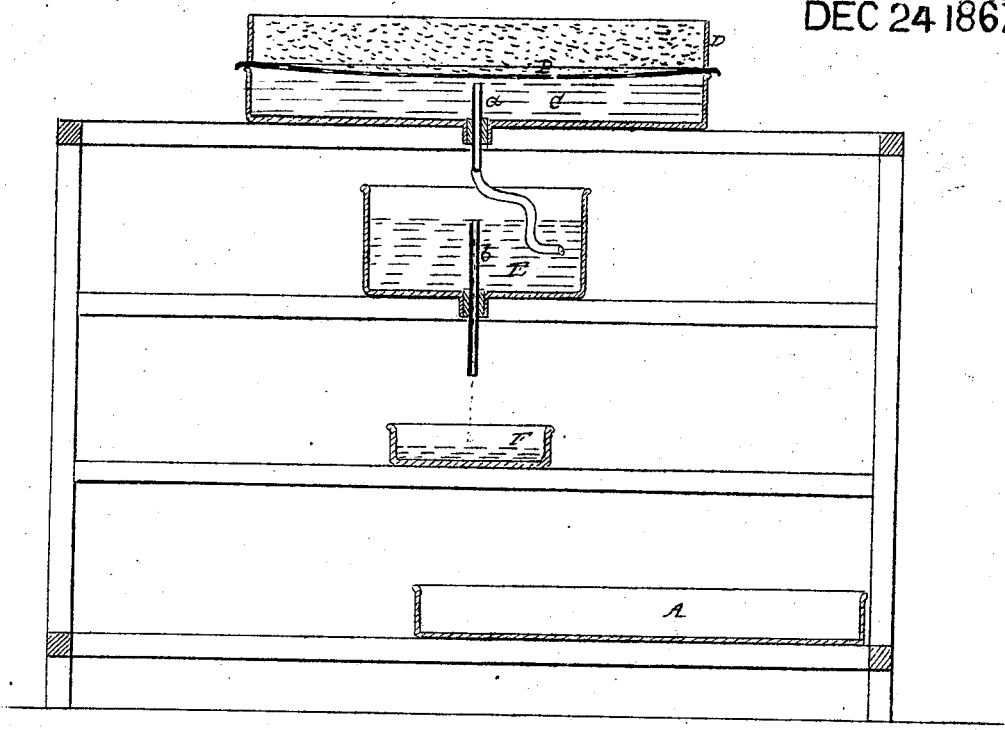
Figure 2:
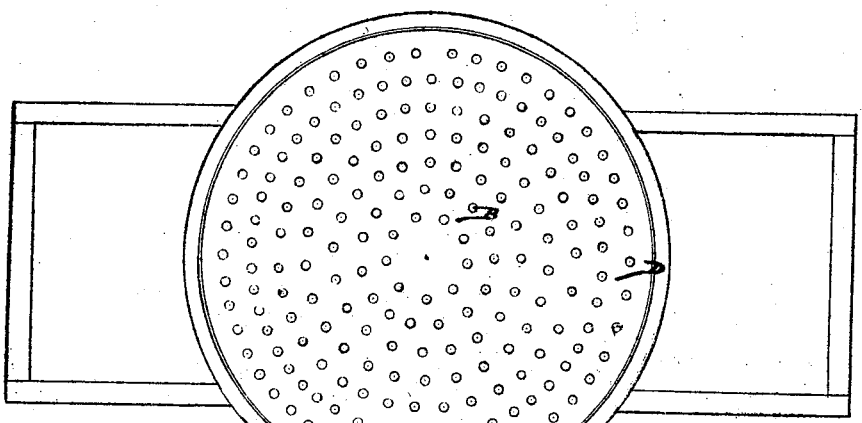

Figure 1 represents a sectional elevation of an apparatus, or details connected therewith or forming the same, in illustration of my invention, and Figure 2 a plan thereof.

Similar letters of reference indicate corresponding parts.

My invention relates to the manufacture of albumen from blood by a simple and novel process of treating the same, which may be thus described, in connection with the apparatus shown in the accompanying drawing.

I take, for instance, blood as it is found at the slaughter-house, and putting it in a tub or vessel, A, transfer the contents therefrom into or on to a sieve or drainer, B, which may be done by arranging the sieve over the tub, and turning the latter, with the sieve, upside down, over, and so as to leave said sieve on or across a vessel, C, after which a loose ring, D, may be applied to hold the contents in place. The clotty matter is then cut through and through in various crosswise directions, for the purpose of severing or shredding, as it were, the veins, in order more perfectly to extract the albumen. The varied fluid-matter running from the sieve or drainer into the vessel C is then allowed to remain twenty-four hours, more or less, when a sliding or vertically-adjustable pipe, $a$, is lowered to run off the same into a vessel, E, where it is further allowed to stand, say twenty-four hours, prior to (or the cleared portion of it) being again run off by suitably lowering a sliding or vertically-adjustable pipe, $b$, so as to only draw off the fluid albumen or albumen-water, leaving the sediment behind it in the vessel E. The tub A, and vessels or parts B, C, D, and E, should all be made of or lined or faced with zinc, to secure that cleanliness by frequent washings which it is necessary to observe, and to prevent the adhesion of old blood or matter that would affect the new, to the injury or deterioration of the albumen produced. As the albumen-water is decanted from the vessel E, it is allowed to run into a tray, F, which should be made of glass, and not of zinc, as the application of heat to which it is necessary to subject said tray would cause the chloride of sodium in the zinc to injuriously affect the albumen. This tray, with its contents, is then removed to any suitable heating-chamber or device, and exposed to a temperature, for twenty-four hours or thereabouts, of 65° Reaumur, (more or less,) and afterwards allowed gradually to cool, say for twenty-four hours longer, to about 30° Reaumur, when it will be solidified, and in a condition ready to bottle or pack for the market or for use, as or for the purposes albumen is ordinarily required.

It will be obvious that this, my improved process of manufacturing albumen, may be variously modified as regards the character of the vessels employed and periods for the performance of its several stages, as also the temperature at which certain of the latter are conducted, but the description here given illustrates in a practical manner how this my improvement may be very successfully carried into practice.

What is therefore here claimed, and desired to be secured by Letters Patent, is—

The process, substantially as herein described, of manufacturing or extracting albumen from blood.

JEAN MICHEL FUCHS.

Witnesses:
J. W. COOMBS,
A. LE CLERC.